United States Patent [19]

Nakajima et al.

[11] 3,863,444

[45] Feb. 4, 1975

[54] AIR-POLLUTION PREVENTIVE ARRANGEMENT

[75] Inventors: Yasuo Nakajima, Yokosuka; Takeji Oguri, Yokohama; Hiroshi Kuroda, Tokyo, all of Japan

[73] Assignee: Nissan Motor Company, Limited, Yokohama City, Japan

[22] Filed: Sept. 27, 1973

[21] Appl. No.: 388,800

Related U.S. Application Data

[62] Division of Ser. No. 160,278, July 7, 1971, Pat. No. 3,826,089.

[52] U.S. Cl. .................. 60/289, 23/288 F, 60/299, 60/306, 137/610
[51] Int. Cl. ............................................ F01n 3/14
[58] Field of Search ............ 60/289, 290, 276, 299, 60/301, 306; 23/288 F; 137/610

[56] References Cited
UNITED STATES PATENTS

| | | | |
|---|---|---|---|
| 3,086,353 | 4/1963 | Ridgway | 60/290 |
| 3,109,715 | 11/1963 | Johnson | 60/299 |
| 3,186,806 | 6/1965 | Stiles | 60/289 |
| 3,203,168 | 8/1965 | Thomas | 60/290 |
| 3,248,872 | 5/1966 | Morrell | 60/286 |
| 3,406,515 | 10/1968 | Behrens | 60/274 |
| 3,438,198 | 4/1969 | Bentele | 60/305 |
| 3,441,381 | 4/1969 | Keith | 60/302 |
| 3,648,455 | 3/1972 | Muroki | 60/290 |

FOREIGN PATENTS OR APPLICATIONS

| 941,632 | 7/1948 | France | 137/610 |
|---|---|---|---|

*Primary Examiner*—Douglas Hart
*Attorney, Agent, or Firm*—Depaoli & O'Brien

[57] ABSTRACT

An air-pollution preventive arrangement for use with an internal combustion engine for motor vehicles, adapted to reduce the concentrations of noxious compounds such as unburned hydrocarbons and carbon-monoxides contained in the engine exhaust gases. The arrangement comprises a thermal reactor for primarily re-combusting the exhaust gases and a catalytic converter for secondarily recombusting the exhaust gases passed from the thermal reactor so as to oxidize the residual unburned compounds. An air injection unit supplies additional air which is admixed, in a limited proportion, to the exhaust gases entering the thermal reactor to aid in the primary re-combustion of the exhaust gases therein. The noxious unconsumed hydrocarbons and carbon-monoxides are thus converted into innocuous compounds at efficiencies which are far higher than those attained where the thermal reactor or the catalytic converter is employed independently. Such additional air may also be admixed to the exhaust gases entering the catalytic converter which is located downstream of the thermal reactor, whereby the re-combustion efficiencies of the reactor and converter are maintained at high levels throughout varying driving conditions of the motor vehicle. The arrangement may also comprise a second catalytic converter which is adapted to reduce nitrogen oxides in the exhaust gases.

2 Claims, 12 Drawing Figures

Fig. 7

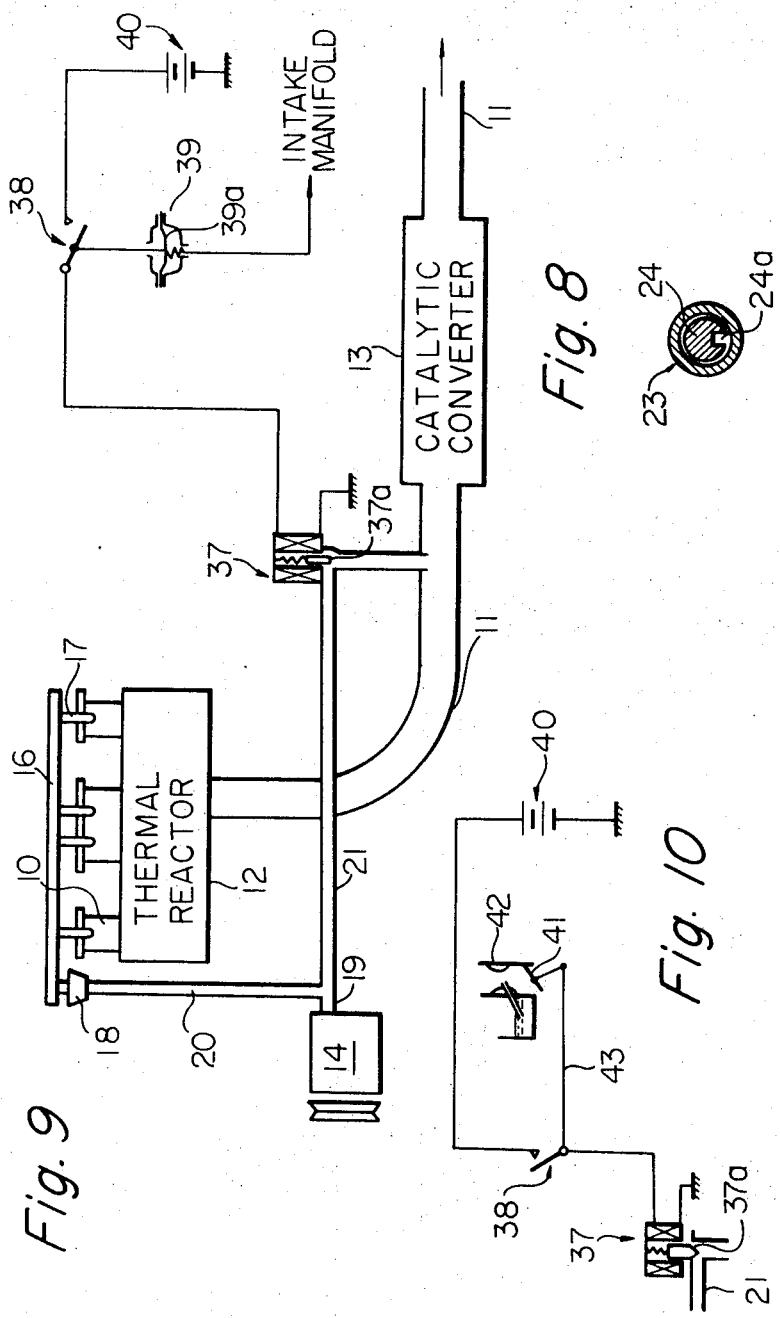

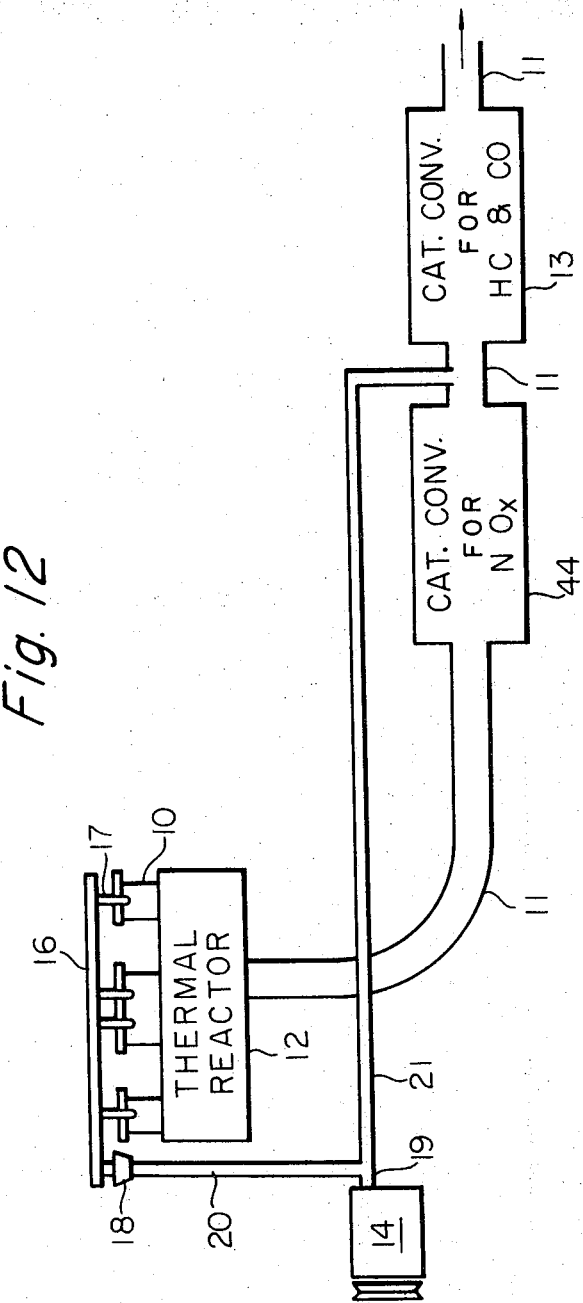

AIR-POLLUTION PREVENTIVE ARRANGEMENT

This application is a division of Ser. No. 160,278, filed July 7, 1971, now U.S. Pat. No. 3,826,089, and is directed to the invention shown in FIGS. 7 and 8.

This invention relates to an exhaust system of an internal combustion engine for motor vehicles and, more particularly, to an air-pollution preventive arrangement for use with the exhaust system of the engine.

The air-pollution preventive arrangement to which this invention is directed is specifically of the character which is adapted to oxidize unconsumed noxious compounds such as hydrocarbons and carbon-monoxides contained in exhaust gases emitted from the engine and discharged through the exhaust system.

A variety of attempts have thus far been made for the purpose of reducing the concentrations of the unconsumed hydrocarbons and carbon-monoxides in the engine exhaust gases. One useful means to achieve this purpose is to have the exhaust system equipped with a thermal reactor by which the exhaust gases, when passed therethrough, are re-combusted by the aid of secondary or additional air introduced into exhaust ports of the exhaust system. It is, in this instance, known that the thermal reactor tends to burn more of the hydrocarbons than the carbon-monoxides. Another important expedient is to employ a catalytic converter which is also mounted on the exhaust system so as to oxidize the unconsumed compounds in the exhaust gases with additional air before the exhaust gases are discharged. Contrary to the thermal reactor, this catalytic converter is known to have the tendency of burning more of the carbon-monoxides than the hydrocarbons.

Where the thermal reactor is incorporated in the exhaust system, the reactor should be internally maintained at an extremely elevated temperature, say of the order of 900°C to 1,000°C, in order that the unconsumed compounds in the exhaust gases be burned or oxidized to such concentrations are acceptable for air-pollution preventive purposes. This makes it necessary to use costly and highly heat-resistive materials to build the thermal reactor. Because, moreover, of the tendency that less of the carbon-monoxides are oxidized than the hydrocarbons as above noted, the exhaust gases which have been passed through the thermal reactor still contain the unburned carbon-monoxides in a considerable concentration in most cases.

In the catalytic converter by which the noxious unconsumed hydrocarbons and carbon-monoxides are changed into practically innocuous compounds, on the other hand, it is known that the re-combustion efficiency is substantially unchanged irrespective of a variation in the concentrations of the unconsumed compounds in the exhaust gases admitted into the catalytic converter. If, therefore, the unconsumed compounds with relatively high concentrations are introduced into the catalytic converter, the result will be that the noxious compounds in the exhaust gases remain still unburned in considerable concentrations even after the exhaust gases have been treated in the catalytic converter. Since, moreover, the catalytic converter tends to oxidize less of the hydrocarbons than the carbon monoxides the exhaust gases passed through the catalytic converter contain a considerable quantity of residual hydrocarbons, conversely to the case of the thermal reactor.

It is, therefore, an important object of this invention to provide an improved air-pollution preventive arrangement by which both the hydrocarbons and carbon-monoxides contained as unconsumed in the engine exhaust gases are oxidized satisfactorily without resort to heating them to extremely high temperatures in the exhaust system.

To achieve this object, this invention proposes to use both the thermal reactor and the catalytic converter in combination so as to exploit the combined advantages of them. In the air-preventive arrangement according to this invention, the engine exhaust gases admitted into the exhaust system are primarily re-combusted when passing through the thermal reactor which is mounted on the exhaust system and which is located posterior to the exhaust ports. The exhaust gases entering the thermal reactor are preliminarily mixed with secondary or additional air introduced into the exhaust ports from an air injection unit so as to aid in the re-combustion of the exhuast gases. The exhaust gases are then passed to the catalytic converter which is located posterior to the thermal reactor for thereby being further re-combusted to remove the residual unconsumed compounds in the exhaust gases. The engine exhaust gases are thus re-combusted in two consecutive steps so that the exhaust gases need not be heated to an extremely high temperature in the thermal reactor and that considerably leaned exhaust gases are passed to the catalytic converter. The toxic compounds contained in the engine exhaust gases can thus be reduced to concentrations which are far lower than those which would be result from an arrangement using the thermal reactor or the catalytic converter independently.

It is, in this instance, pointed out that the efficiency of re-combusting the unconsumed hydrocarbons and carbon-monoxides is closely related to air-to-fuel ratios of a combustible mixture to be supplied to the engine. The air-to-fuel ratio of the combustible mixture varies in a relatively broad range throughout various modes of operation of the motor vehicle and, for this reason, it is preferable that the re-combustion efficiencies of the thermal reactor and the catalytic converter are maintained at high levels irrespective of the variation in the air-to-fuel ratio of the combustible mixture.

It is therefore another important object of this invention to provide an air-pollution preventive arrangement by which the toxic hydrocarbons and carbon-monoxides are re-combusted by a combiantion thermal reactor and catalytic converter at efficiencies which are substantially independent from the air-to-fuel ratios of the combustible mixture supplied to the engine.

In the arrangement to achieve this object, the exhaust gases which have been primarily re-combusted in the thermal reactor are further mixed with secondary or additional air supplied from the above mentioned air injection unit. This is advantageous not only for maintaining the re-combustion efficiencies of the thermal reactor and the catalytic converter but for preventing the thermal reactor from being heated to a remarkably high temperature because the reactor receives the additional air only in a limited proportion. If desired, in this instance, the proportion of the additional air to be supplied to the thermal reactor and the catalytic converter may be regulated in accordance with the variation in the air-to-fuel ratio of the combustible mixture for the engine so that the re-combustion efficiencies of the reactor and converter are kept at high levels throughout the varying modes of operation of the engine. Or otherwise, means may be provided so as to shut off the flow of additional air to be mixed to the exhaust gases entering the catalytic converter during lightload and/or low-speed operations of the engine when the unconsumed noxious compounds are contained in relatively small quantities in the engine exhaust gases in spite of the relatively high concentration thereof.

The combination thermal reactor and catalytic converter which forms part of the air-pollution preventive arrangement implementing this invention may be combined with a second catalytic converter which, in this instance, is adapted to convert nitrogen oxides into innocuous compounds. The arrangement including such second catalytic converter also falls within the scope of this invention.

The nature of the invention and the advantages thereof will be apparent to those skilled in the art from the succeeding detailed description of the preferred embodiments of the invention and the accompanying drawings in which:

FIG. 7 is a diagrammatic view of a further modification of the arrangement of FIG. 5;

FIG. 8 is a section on line 8—8 of FIG. 7;

FIG. 9 is a diagrammatic view showing a still further modification of the arrangement of FIG. 5;

FIG. 10 is a schematic diagram showing part of a modification of the arrangement shown in FIG. 9;

FIG. 12 is a diagrammatic view showing a modification of the arrangement shown in FIG. 11.

Figure 1:
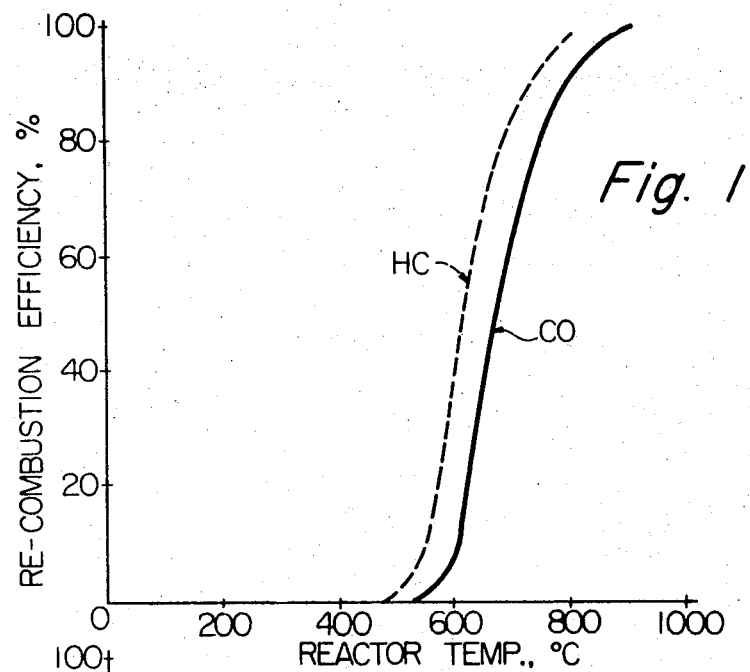
FIG. 1 is a graph showing examples of reduction rates of the unconsumed hydrocarbons (HC) and carbon-monoxides (CO) as attained by the use of a typical thermal reactor, indicating the general relationship between the re-combustion efficiency, in percent on the ordinate and the reactor core temperature in centigrade on the abscissa.
Figure 2:
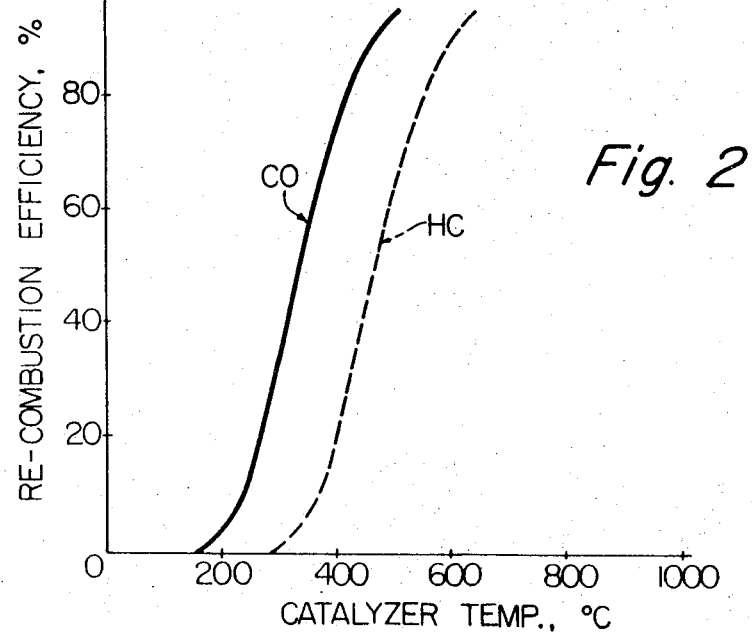
FIG. 2 is similar to FIG. 1 but now shows the reduction rates as attained where a typical catalytic converter is used, the rates being indicated in terms of the catalyzer temperature on the abscissa.

The previously noted tendencies of the thermal reactor and the catalytic converter can be evidently ascertained from observation of FIGS. 1 and 2 which indicate that more of the hydrocarbons are reduced than the carbon-monoxides by the thermal reactor and that more of the carbon-monoxides are reduced than the hydrocarbons by the catalytic converter. FIG. 1 further indicates that the reactor should be heated up to about 900°C to 1000°C in order to satisfactorily reduce the unconsumed compounds in the exhaust gases.

Figure 3:
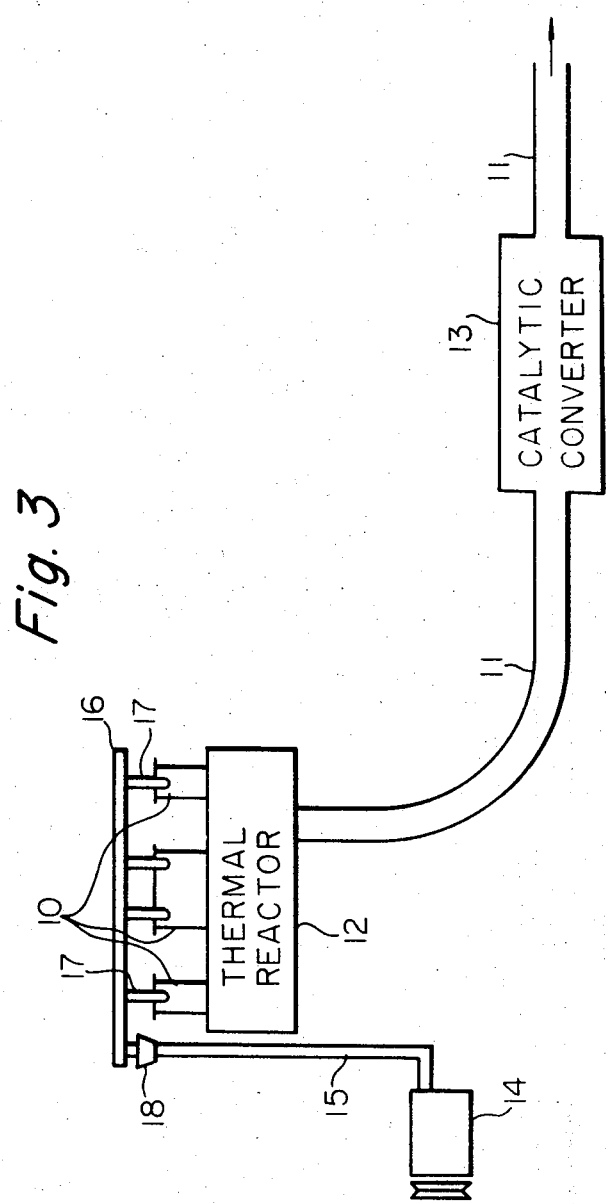
FIG. 3 is a diagrammatic view of an air-preventive arrangement embodying this invention.

Reference is now made to FIG. 3 in which a basic construction of the air-pollution preventive arrangement according to this invention is illustrated. The air-pollution preventive arrangement is mounted on an exhaust system including exhaust ports 10 and an exhaust passage 11. The exhaust passage 11 may be part of any of an exhaust manifold and an exhaust pipe which usually constitute the exhaust system although not shown. The air-pollution preventive arrangement includes a thermal reactor 12 located posterior to the exhaust ports 10 and a catalytic converter 13 located posterior to the thermal reactor 12 which has mounted therein a reactor core (not shown) whereby the exhaust gases introduced thereinto are recombusted by the aid of secondary or additional air which is drawn into the exhaust ports. The catalytic converter 13, on the other hand, has a catalyzer bed (not shown) by which the exhaust gases passed therethough are recombusted chemically. The thermal reactor an the catalytic converter per se are well known to those skilled in the art and, as such, no detailed description is herein made as to the construction and operation thereof.

The secondary or additional air to be drawn into the exhaust ports 10 is supplied from an air injection unit including a pneumatic pump 14 of known construction. The pneumatic pump 14 communicates with the exhaust ports 10 through an air passage 15, an air gallery 16 leading from the air passage, and air injection nozzles 17 branched from the air gallery and opened into the exhaust ports 10. A one-way check valve 18 may be mounted on the air passage 15 so as to prevent a reverse flow of the exhaust gases into the air passage.

The exhaust gases which have been emitted from combustion chambers (not shown) of the engine are first passed into the exhaust ports 10 immediately downstream of the combustion chambers and are mixed with additional air spurting into the exhaust ports through the air injection nozzles 17. The exhaust gases are then admitted into the thermal reactor 12 in which the exhaust gases are primarily re-combusted and the unconsumed hydrocarbons and carbon-monoxides contained therein are oxidized by the oxygen of additional air mixed thereto. The toxic hydrocarbons and carbon-monoxides in the exhaust gases are in this manner converted into innocuous compounds at an efficiency which is dictated by predetermined performance characteristics of the thermal reactor 12. The exhaust gases which have been primarily re-combusted in the thermal reactor 12 are passed to the catalytic converter 13 through the exhaust passage 11 for secondary re-combustion therein. Since, in this instance, the exhaust gases admitted into the catalytic converter 13 are considerably leaned out as a result of the re-combustion in the thermal reactor, the residual unburned hydrocarbons and carbon-monoxides contained therein can be burned satisfactorily in the catalytic converter so that the exhaust gases contain the unconsumed compounds in concentrations which are fully acceptable for air-preventive purposes. Because, moreover, the thermal reactor 12 is required to recombust only a limited portion of the unconsumed compounds, the exhaust ports 10 need not be supplied with a plenty of additional air which would otherwise result in heating of the exhaust gases to an extremely elevated temperature. Experiments conducted with the shown arrangement show that the exhaust gases in the thermal reactor 12 are heated only to about 600°C to 700°C.

If, now, the concentration by weight of the total unconsumed compounds in the exhaust gases to be introduced into the thermal reactor is $Ci(\%)$ and the concentrations by weight of the unconsumed compounds in the exhaust gases which have been primarily and secondarily re-combusted are $Cp$ and $Cs(\%)$, respectively, and if the re-combustion efficiencies of the thermal reactor and the catalytic converter are $Er$ and $Ec(\%)$, respectively, the the following relations hold:

$$Er = (1 - Cp/Ci) \times 100$$

Eq. 1

$$Ec = (1 - Cs/Cp) \times 100$$

Eq. 2

If the final conversion efficiency of the combination thermal reactor and catalytic converter is $Ef$, then $$Ef = (1 - Cs/Ci) \times 100$$

Eq. 3

From Equations 1 to 3, the following relation is obtained:

$$Ef = \{1 - (1 - Er/100)(1 - Ec/100)\} \times 100$$

Eq. 4

Here, since $0<Er<100$ and $0<Ec<100$, $Et>Er$ and $Et>Ec$. This means that the final re-combustion efficiency of the combination reactor and converter is higher than the re-combustion efficiency of the reactor or the converter used independently. If, as a matter of fact, $Er = Ec = 50$ percent, the exhaust gases containing the unconsumed compounds of a 100 percent concentration are re-combusted in the thermal reactor, the resultant exhaust gases contain the unconsumed compounds of a 50 percent concentration. If these exhaust gases are then secondarily re-combusted in the catalytic converter, the concentration of the unconsumed compounds in the finally discharged exhaust gases is reduced to 25 percent and, hence, the final re-combustion efficiency is 75 percent which apparently is higher than the re-combustion efficiency of 50 percent as attained where either the thermal reactor or the catalytic converter is used independently.

Where it is desired to have available the final re-combustion efficiency $Er$ of 0.9, 0.8 or 0.7, the conversion efficiencies $Er$ and $Ec$ may preferably be assigned to the thermal reactor and the catalytic converter, respectively, in the following proportions.

| $Et(\%)$ | $Er(\%)$ | $Ec(\%)$ |
|---|---|---|
| 90 | 50 | 80 |
|  | 60 | 75 |
|  | 70 | 67 |
|  | 80 | 50 |
| 80 | 40 | 67 |
|  | 50 | 60 |
|  | 60 | 50 |
|  | 70 | 35 |
| 70 | 30 | 57 |
|  | 40 | 50 |
|  | 50 | 40 |
|  | 60 | 25 |

The re-combustion efficiency of the thermal reactor may be varied by properly selecting the heat insulator for the reactor core to vary the thermal capacity of the core or by varying the rate of supply of the additional air to the exhaust ports. The re-combustion efficiency of the catalytic converter, on the other hand, may be varied by proper selection of the material making up the converter or of the thermal capacity of the catalyzer.

Figure 4:
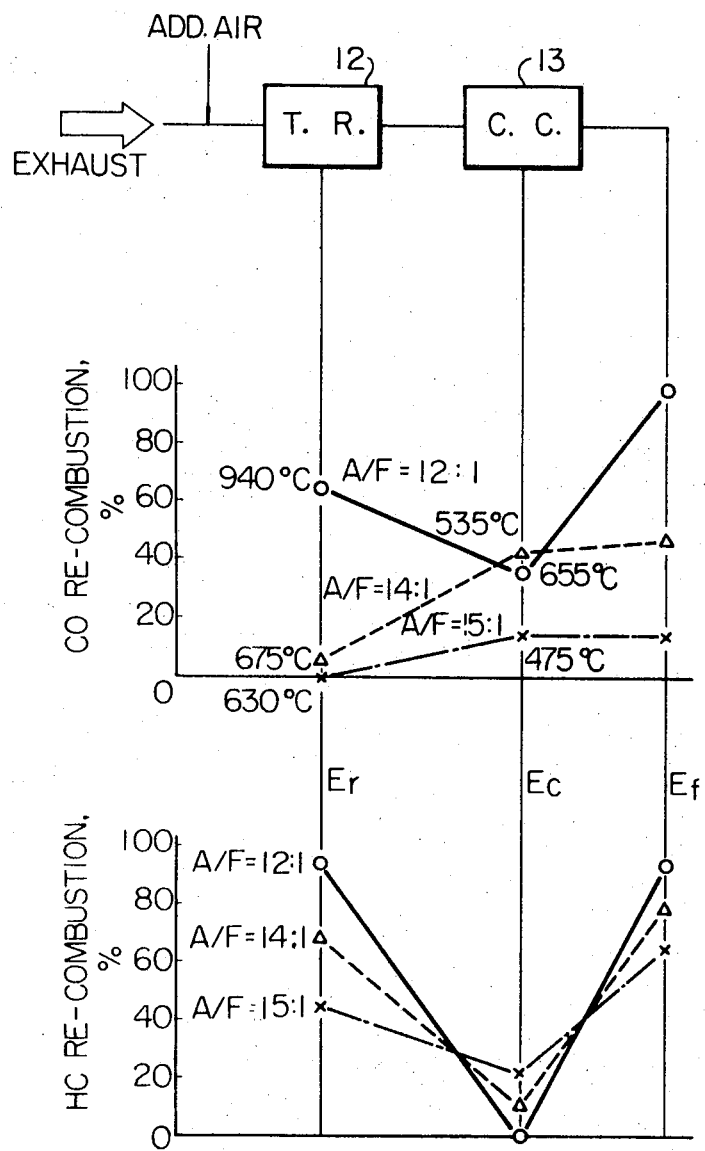
FIG. 4 is a graph showing re-combustion efficiencies in percent as attained in the arrangement of FIG. 3, the efficiencies being indicated in terms of the air-to-fuel ratio of the combustible mixture for the engine.
Figure 5:
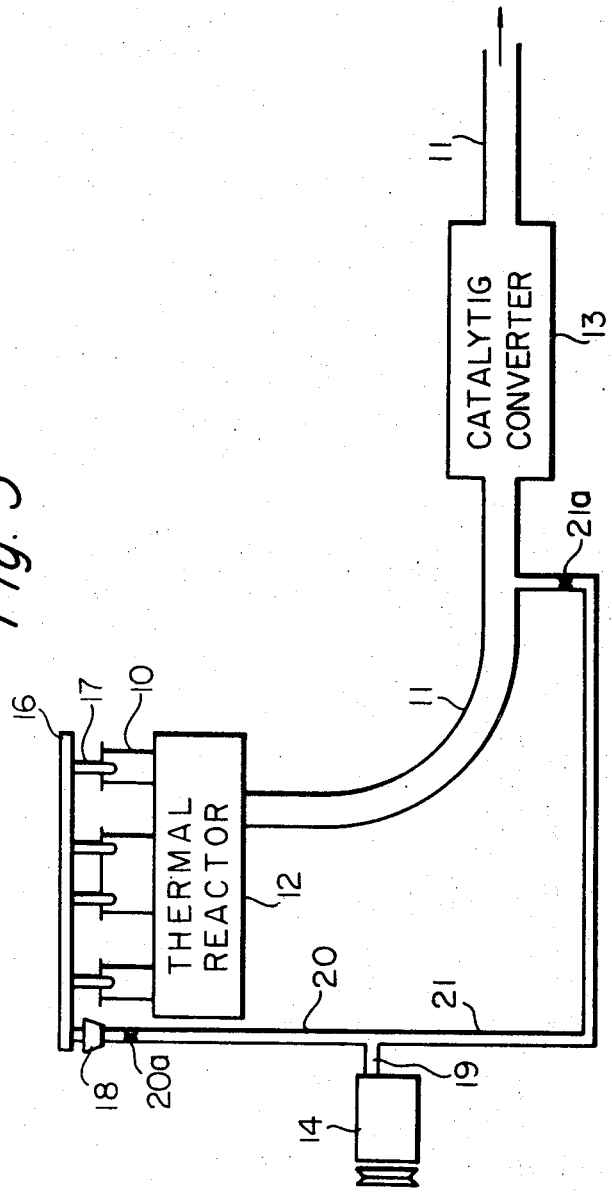
FIG. 5 is a diagrammatic view of a modification of the arrangement shown in FIG. 3.

FIG. 4 shows the efficiencies of re-combusting the unconsumed hydrocarbons and carbon-monoxides in the arrangement shown in FIG. 3 in terms of the air-to-fuel ratio of the combustible mixture supplied to the engine during various modes of operation. Here, it is assumed that the additional air is admixed to the exhaust gases in a proportion substantially corresponding to 20 percent of the air component of the combustible mixture for the engine. As seen in FIG. 4, the total re-combustion efficiency depends much upon the air-to-fuel ratio of the combustible mixture. Since, as previously noted, the air-to-fuel ratio of the combustible mixture varies markedly in a relatively broad range throught varying driving conditions of the engine, it is most preferable that the final recombustion efficiency be maintained at high levels irrespective of the variation in the air-to-fuel ratio of the combustible mixture. Since, moreover, the additional air is admixed solely to the exhaust gases which are led into the thermal reactor in the arrangement shown in FIG. 3, the reactor will tend to be heated to an unduly high temperature and may fail to operate in a sound state, especially when the engine is driven under heavy-load and/or high-speed conditions in which the engine is supplied with a relatively rich combustible mixture and consequently the exhaust gases contain the unconsumed compounds of relatively high concentrations to require a great quantity of additional air for being re-combusted. To solve these two problems concurrently, the arrangement shown in FIG. 4 may be modified in a manner that the additional air is admixed not only to the exhaust gases to be primarily re-combusted in the thermal reactor but to the exhaust gases which are to be secondarily re-combusted in the catalytic converter, such modified arrangement being shown in FIG. 5.

In this modified arrangement, an air passage 19 leading from the pneumatic pump 14 is diverted into two branch passages 20 and 21 as illustrated. The branch passage 20 leads to the air gallery 16 similarly to the passage 15 in the arrangement of FIG. 3, while the other branch passage 21 is opened at its leading end in the exhaust passage 11 upstream of the catalytic converter 13. Restrictions or orifices 20a and 21a may preferably be mounted in the branch passages 20 and 21, respectively, so as to restrict or meter the flow of the additional air through the branch passages. With this arrangement, the exhaust gases entering the thermal reactor are mixed with the additional air of quantities which are insufficient for the total re-combustion of the exhaust gases in the reactor so that, even when the exhaust gases contain the unconsumed compounds of relatively high concentrations as in the heavy-load and/or high-speed driving conditions of the engine, the reactor is prevented from being excessively heated. In this instance, unless the additional air is admixed to the exhaust gases entering the catalytic converter, the result will be that the exhaust gases can not be re-combusted satisfactorily therein due to lack of oxygen. Through provision of the branch passage leading to the exhaust passage upstream of the catalytic converter as in the arrangement shown in FIG. 5, such can be avoided and the exhaust gases are secondarily re-combusted in satisfactory conditions.

Figure 6:
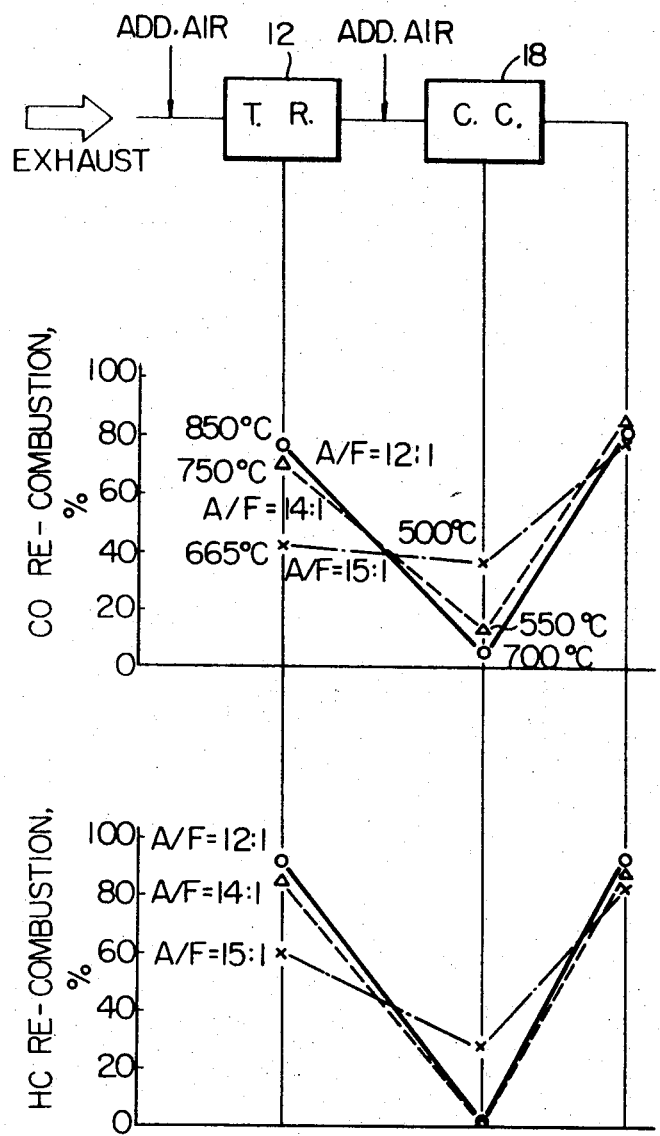
FIG. 6 is similar to FIG. 4 but now shows the recombustion efficiencies attained in the arrangement of FIG. 5.

The orifices 20a and 21a may be calibrated suitably in consideration of the re-combustion efficiencies available in the thermal reactor and the catalytic converter. FIG. 6 shows examples of the re-combustion efficiencies of the hydrocarbons and carbon-monoxides attained by the use of the arrangement of FIG. 5 for different air-to-fuel ratios of the combustible mixture supplied to the engine, in which the orifices 20a and 21a are assumed to be calibrated in such a manner that the additional air is distributed to the branch passages 20 and 21 in a proportion of about 3 : 1. It is understood from this graph that the final re-combustion efficiencies of the hydrocarbons and carbon-monoxides can be maintained at sufficiently high yet substantially fixed levels without respect to the variation in the air-to-fuel ratio of the combustible mixture for the engine. Here, it is also understood that the temperature in the thermal reactor can be reduced significantly, say from about 940°C in the arrangement of FIG. 3 to about 850°C in the arrangement of FIG. 5 with the air-to-fuel ratio set at 12 : 1 as in the heavy-load and/or high-speed driving conditions of the engine.

Figure 7:
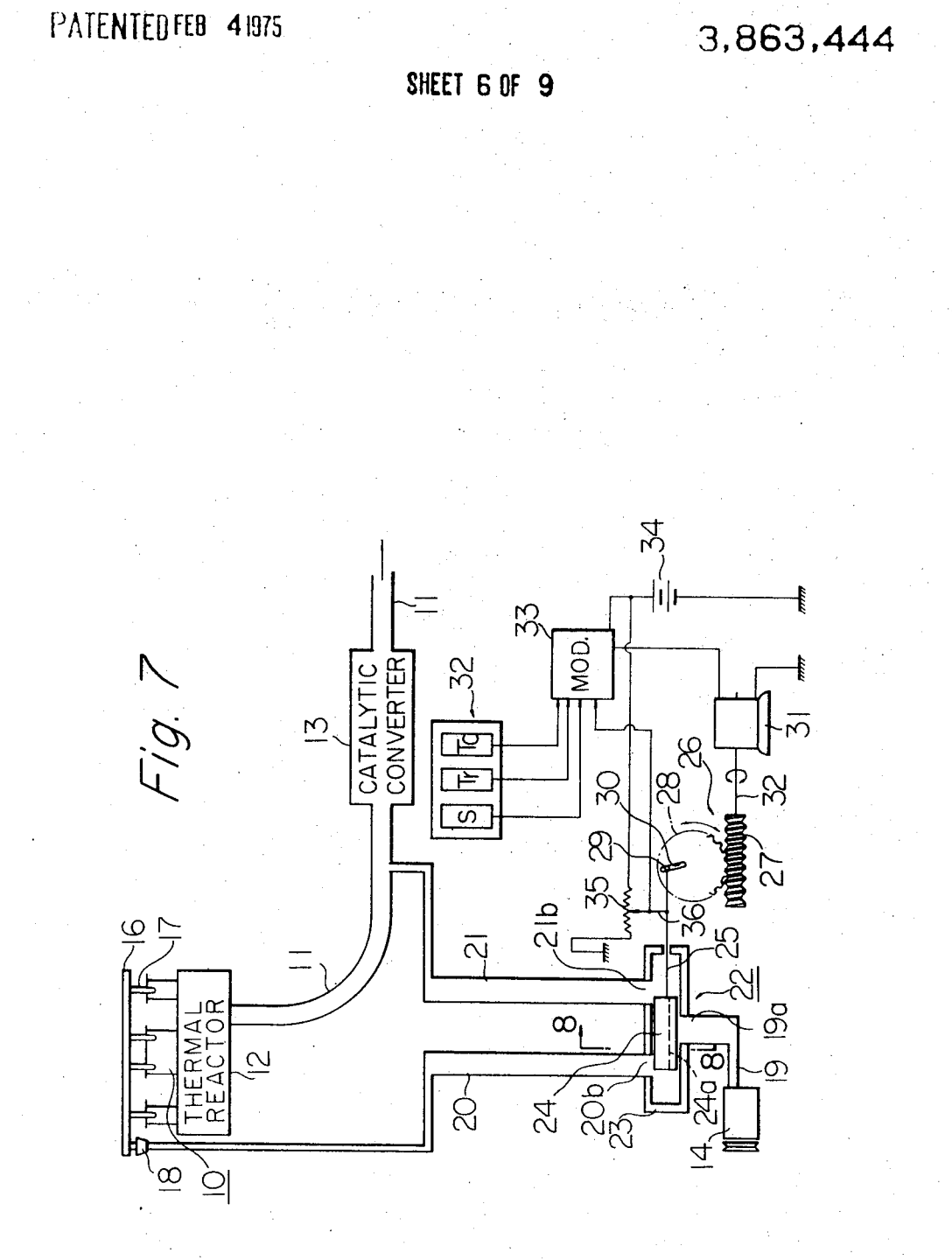

The optimum proportion of the additional air to enable the reactor and converter to operate most efficiently naturally varies with the operating conditions of the engine. It is, therefore, preferable that the proportion of the additional air distributed to the two branch passages be positively regulated in accordance with the varying operating conditions of the engine. Since, as previously discussed, the re-combustion efficiencies of the reactor and converter are sizeably dictated by the air-to-fuel ratios of the combustible mixture, the proportion of the distributed additional air may advantageously regulated in relation to the air-to-fuel ratio of the combustible mixture. FIG. 7 illustrates an arrangement realizing this concept.

Referring to FIG. 7, the air passage 19 leading from the pneumatic pump 14 is connected to the branch passages 20 and 21 through a distributor 22. The distributor 22 comprises a chamber 23 into which the air passage 19 is opened at its outlet port 19a and from which the branch passages 20 and 21 lead at their inlet ports 20b and 21b, respectively, thus providing communication between the air passage and the branch passages. The chamber 23 has slidably accommodated therein a piston 24 having formed therein a groove 24a extending longitudinally thereof to provide communication between the outlet port 19a of the air passage 19 and the chamber 23, the groove being best seen in FIG. 8. A piston rod 25 projects from the piston 24 and extends outwardly through a wall of the chamber 23. The piston rod 25 is operatively connected to a gearing unit 26 by which the piston rod is reciprocally moved relatively to the chamber 23. This gearing unit 26 is herein shown as made up of a worm 27 and a gear 28 meshing with the worm. In this instance, the piston rod 25 is connected to the gear 28 through a pin 29 movably fitting in a radially elongated slot 30 formed in the gear. Thus, as the worm 27 is turned about its axis, the gear 28 rotates on the worm to cause the piston rod to move in an axial direction relatively to the chamber 23. This causes the piston 24 to move relatively to the outlet port 19a of the air passage 19 and to the inlet ports 20b and 21b of the branch passages 20 and 21, respectively, so as to vary a proportion of areas of communication between the outlet port 19a and the inlet ports 20b and 21b through the groove 24a in the piston. The flow rate of the additional air from the air passage 19 to the branch passages 20 and 21 through the chamber 23 is thus determined by a relative position of the piston 24 and accordingly of an angular position of the gear 28. This angular position of the gear 28, in turn, is dictated by a direction and turns of the rotation of the worm 27. The worm 27 is coupled to and driven by a reversible motor 31 through a coupling shaft 32. The motor 31 is electrically connected to and energized by an electric control unit including a detecting means 32 which detects the air-to-fuel ratio of the combustible mixture for the engine. This air-to-fuel ratio may be represented by any operating variable or variables of the engine and/or the associated units thereof. For instance, the air-to-fuel ratio may be detected on the basis of a flow rate of the air to be contained in the combustible mixture for the engine and a rate of supply of the combustible mixture to the engine. The flow rate of the air, in turn, may be represented by a suction in a venturi of a carburetor or an engine speed and a suction in an intake manifold of the engine. The rate of supply of the combustible mixture to the engine, on the other hand, may be represented by temperatures in the thermal reactor 12 and the catalytic converter 13. The detecting means 32 is herein shown as detecting the suction S in the venturi and the temperatures Tr and Tc in the reactor 12 and the converter 13, respectively. The detecting means 32 is connected to an input of a modulator 33 to supply thereto electric signals carrying information as to the air-to-fuel ratio detected by the means 32. The modulator 33, in turn, is connected at its output to the reversible motor 31, and supplies thereto an electric signal to actuate the motor to rotate in a direction dictated by the detected air-to-fuel ratio of the combustible mixture. The motor 31 is energized, when actuated by a power supply source 34 through the modulator 33. The motor 31 is in this manner actuated in accordance with the information supplied to the modulator 33 so as to turn the worm 27 and accordingly the gear 28 through the coupling shaft 32 with the result that the piston 24 is moved longitudinally through the piston rod 25. The direction and amount of displacement of the piston 24 thus depends upon the air-to-fuel ratio approximated by the information supplied from the detecting means 32 so that the additional air from the air passage 19 is passed to the branch passages 20 and 21 in a proportion substantially pertinent to the air-to-fuel ratio of the combustible mixture supplied to the engine at any given instant. As such pertinent proportion of the additional air to the branch passages is established, the motor 31 should be shut down temporarily. For this purpose, a feedback means adapted to supply the modulator with information as to this condition may be provided in the electric control unit. Such feedback means may comprise a potentiometer mounted on the gear 28 of the gearing unit 26 to produce a signal representing an angular position of the gear but, in the shown arrangement, the feedback means is illustrated to comprise a rheostat having a resistor 35 connected to the power supply source 34 and a sliding contactor 36 which is mechanically connected to and movable with the piston rod 25. The sliding contactor 36 is not only in sliding contact with the resistor 35 but electrically connected to the modulator 33 so that a feedback signal representing a resistance in the resistor 35 is supplied to the modulator.

During acceleration of the motor vehicle, the unconsumed compounds in the exhaust gases are emitted from the engine in increased concentrations but in relatively small quantities as a whole because of the limited supply of the combustible mixture to the engine. It is, therefore, advantageous that the exhaust gases be recombusted solely by the thermal reactor without aid of the catalytic converter with the additional air supplied only to the exhaust ports. For this purpose, a device may be provided to temporarily interrupt passage of the additional air through the branch passage 21 during deceleration. This device may be associated with the modulator 33 so as to totally close the inlet port 21b of the branch passage 21 with the inlet port 20b of the branch passage 20 fully open through detection of decelerating condition such as the suctions in the engine intake manifold higher than a predetermined level. Or otherwise, such device may include a valve means interposed in the branch passage 21 and controlled by a combination switch and detector means responsive to the decelerating conditions of the motor vehicle. An example of the means of this nature are shown in FIGS. 9 and 10.

The device shown in FIG. 9 is adapted to close the branch passage 21 through detection of the intake manifold suctions higher than a predetermined level. This predetermined level is selected to be substantially higher than the suctions prevailing during idling of the engine and may usually be about 550mm of Hg. The shown device includes a solenoid valve 37, a normally closed switch 38 connected to the solenoid valve to de-energize the solenoid valve when opened, a suction operated diaphragm device 39 connected to the switch and a power supply source 40. The solenoid valve 37 is of the usual construction, having a spring-loaded combination armature and valve member 37a normally extending into the branch passage 21 to close it when de-energized. The diaphragm device 39 is also of the usual construction and has a spring-loaded diaphragm member 39a which is subjected to suctions drawn from the engine intake manifold (not shown). The diaphragm member 39a, mechanically connected to the switch 38, is biased by a spring action to a position to close the switch. The diaphragm member 39a is moved by the spring action to a position to close the switch 38 when the suction applied to the diaphragm member 39a decreases below the predetermined level such as about 150mm of Hg, for instance, at which the engine is driven under heavy loads. The branch passage 21 is thus closed and the additional air is passed only to the exhaust ports during deceleration of the motor vehicle.

As an alternative to the device shown in FIG. 9, the device shown in FIG. 10 may be used for the same purpose and with substantially the same results. The device shown in FIG. 10 is now constructed to open the branch passage 21 through detection of the angular position of a throttle valve 41 of a carburetor 42. This device is constructed essentially similarly to the device of FIG. 9 but has a mechanical linkage 43 in lieu of the diaphragm device. The mechanical linkage 43 interconnects the normally closed switch 38 and the throttle valve 41 and is arranged to close the switch 38 when the throttle valve is open at an angle larger than a predetermined valve which may be about 50° at which the engine is driven under heavy loads. The solenoid valve 37 is thus brought into closed position when the motor vehicle decelerates.

The devices shown in FIGS. 9 and 10 may be modified in a manner to normally open the branch passage 21 and to close it under the light-load and low-speed conditions of the engine. For this purpose, the solenoid valve 37 may be constructed to be normally open and to be closed when energized, while the diaphragm device 39 or the mechanical linkage 41 may be arranged to close the switch 38 when the light-load and/or low-speed conditions of the engine are thereby detected. These conditions may be represented by intake manifold suctions higher than a predetermined level which may be about 550mm of Hg in the case of the diaphragm device 39 or by angular positions of the throttle valve which is open at angles smaller than a predetermined valve which may be about 15° in the case of the mechanical linkage 43.

Figure 11:
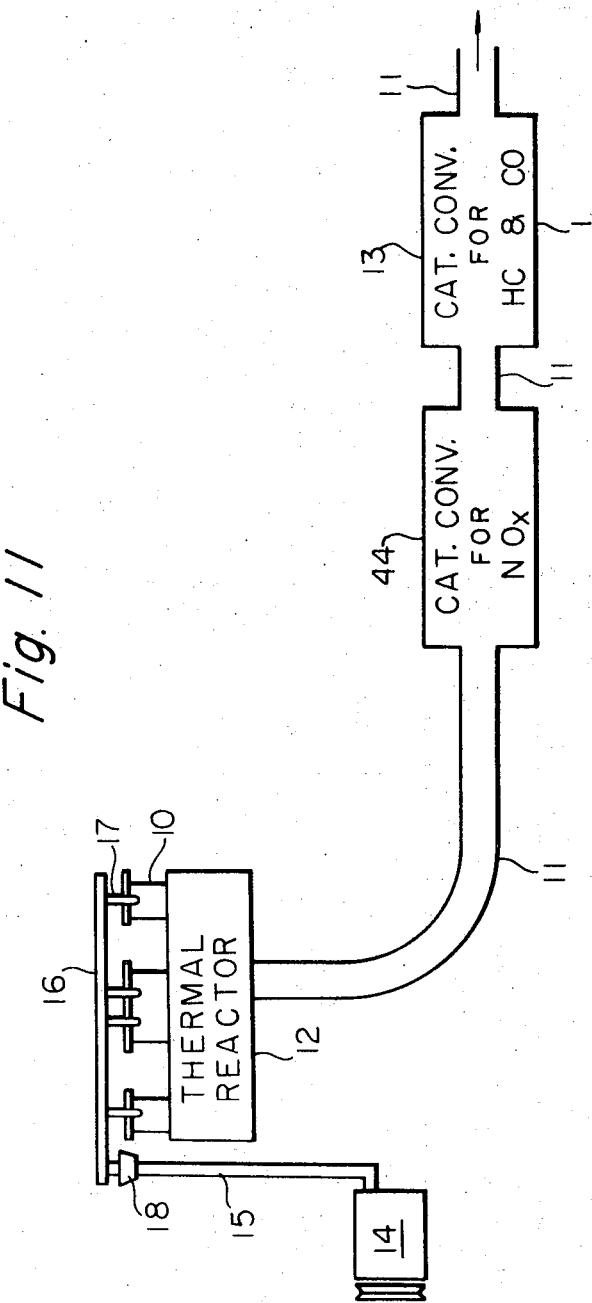
FIG. 11 is a diagrammatic view showing another modification of the arrangement shown in FIG. 3.

FIG. 11 now illustrates another modification of the arrangement shown in FIG. 3, in which a second catalytic converter 44 is mounted on the exhaust passage 11 intervening between the thermal reactor 12 and the catalytic converter 13. This additional catalytic converter 44 has mounted therein a catalyzer (not shown) which is adapted to deoxidize nitrogen oxides contained in the exhaust gases. Similarly to the arrangement shown in FIG. 5, the additional air may be supplied not only to the exhaust ports 10 but to the exhaust passage upstream of the second catalytic converter 13. An arrangement adapted for this purpose is shown in FIG. 12. As shown, the modified arrangement has the air passage 19 which is divided into the branch passages 20 and 21. The branch passage 21 communicates with the exhaust ports 10 similarly to its counterpart in the arrangement of FIG. 5, while the branch passage 21 is opened at its leading end in the exhaust passage 11 intervening between the first and second catalytic converters 13 and 44, respectively. The additional features in the arrangements shown in FIGS. 7, 9 and 10 may be incorporated in the arrangement of FIG. 11, if desired.

Since an ample amount of additional air is not admixed to the exhaust gases entering the thermal reactor 12 in the arrangement shown in FIG. 12 and since the reactor is internally maintained at relatively low temperatures, the exhaust gases primarily re-combusted in the reactor will contain a considerably large quantity of residual unconsumed carbon-monoxides. This makes it easier for the nitrogen oxides to be deoxidized in the catalytic converter 44 through the following reaction:

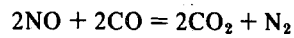

$$2NO + 2CO = 2CO_2 + N_2$$

The arrangement shown in FIG. 12 is thus conductive to reduction of the nitrogen oxides in the exhaust gases let alone its usefulness in reducing the unconsumed hydrocarbons and carbon-monoxides.

It will now be appreciated from the foregoing description that, according to one important aspect of this invention, both the unconsumed hydrocarbons and carbon-monoxides can be oxidized satisfactorily without resort to heating them to extremely high temperatures especially in the thermal reactor. This is advantageous because the thermal reactor need not be built with costly highly heat-resistive materials to assure economical feasibility of the air-pollution preventive arrangement embodying this invention.

According to another important aspect of this invention, the unconsumed compounds in the engine exhaust gases can be re-combusted at efficiencies which are maintained at high and approximately unchanged levels without respect to the variation in the air-to-fuel ratio of the combustible mixture for the engine.

According to still another important aspect of this invention, the re-combustion efficiencies of the thermal reactor and the catalytic converter which are used in combination can be regualted to meet the various operational requirements of the engine of the motor vehicle so as to minimize the concentrations of the toxic compounds in the exhaust gases to be discharged to the open air throughout varying driving conditions of the motor vehicle.

According to still another important aspect of this invention, not only the unconsumed hydrocarbons and carbon-monoxides but the nitrogen oxides contained in the engine exhaust gases can be reduced efficiently.

The arrangement and the modifications thereof as heretofore been described and shown may be modified in numerous manners to offer substantially similar features.

What is claimed is:

1. In an air pollution preventive arrangement, for use with an exhaust system having an exhaust passage through which exhaust gases emitted from an engine of a motor vehicle are discharged, comprising:
   a thermal reactor mounted on said exhaust passage and located posterior to exhaust ports of said exhaust system for primary re-combusting unconsumed hydrocarbons and carbon monoxides contained in said exhaust gases;
   at least one catalytic converter mounted on said exhaust passage and located posterior to said thermal reactor for secondarily re-combusting the exhaust gases passed from said thermal reactor;
   an air injection unit including a pneumatic pump and an air passage divided into first and second branch passages, said first branch passage leading to said exhaust system anterior to said thermal reactor and said second branch passage opening into said exhaust passage anterior to said catalytic converter; the improvement comprising a distributor interposed between said air passage and first and second branch passages, comprising:
   a chamber into which said air passage is opened at its outlet port and from which said branch passages lead at their inlet ports; a piston slidably mounted in said chamber and having formed therein a groove longitudinally extending throughout the piston to provide communication between said outlet port and said inlet ports; a piston rod projecting from said piston and extending outwardly through said chamber, a gearing unit operatively connected to said piston rod for moving said piston through said piston rod in a longitudinal direction, and a reversible motor coupled with said gearing unit to drive the gearing unit selectively in either direction.

2. The air pollution preventive arrangement of claim 1, wherein said gearing unit comprises;
   A. a worm coupled with said reversible motor through a coupling shaft and,
   B. a gear meshing with said worm and having formed therein a radially elongated slot, said piston rod being connected to said gear through a pin movably fitting in said elongated slot, said worm being turned by said motor to rotate said gear in a direction and through an angle determined by the rotation of said reversible motor.

* * * * *